(12) United States Patent
Ketels et al.

(10) Patent No.: US 9,221,370 B2
(45) Date of Patent: Dec. 29, 2015

(54) VEHICLE SEAT

(71) Applicant: Faurecia (China) Holding Co., Ltd., Shanghai (CN)

(72) Inventors: Cedric Ketels, Shanghai (CN); Zhenlin Wu, Shanghai (CN)

(73) Assignee: Faurecia (China) Holding Co., Ltd, Shanghai (CN)

( * ) Notice: Subject to any disclaimer, the term of this patent is extended or adjusted under 35 U.S.C. 154(b) by 0 days.

(21) Appl. No.: 14/415,344

(22) PCT Filed: Jul. 4, 2013

(86) PCT No.: PCT/CN2013/078812
§ 371 (c)(1),
(2) Date: Jan. 16, 2015

(87) PCT Pub. No.: WO2014/012438
PCT Pub. Date: Jan. 23, 2014

(65) Prior Publication Data
US 2015/0183345 A1  Jul. 2, 2015

(30) Foreign Application Priority Data
Jul. 17, 2012  (CN) .......................... 2012 2 0345656

(51) Int. Cl.
*B60N 2/44* (2006.01)
*B60N 3/06* (2006.01)
(Continued)

(52) U.S. Cl.
CPC ................ *B60N 2/448* (2013.01); *A61H 15/00* (2013.01); *A61H 23/04* (2013.01); *B60N 2/4495* (2013.01); *B60N 3/06* (2013.01); *B60N 3/063* (2013.01); *A61H 23/02* (2013.01); *A61H 2201/0149* (2013.01); *A61H 2201/0161* (2013.01); *A61H 2201/0176* (2013.01); *A61H 2201/1238* (2013.01); *A61H 2201/164* (2013.01);
(Continued)

(58) Field of Classification Search
CPC ........ B60N 2/448; B60N 3/06; B60N 2/4495; A61H 15/00; A61H 23/04
USPC .................. 297/217.1, 217.3, 423.26, 423.27
See application file for complete search history.

(56) References Cited

U.S. PATENT DOCUMENTS

| 5,312,155 A | 5/1994 | Akima et al. |
| 6,375,266 B1 * | 4/2002 | Ferguson et al. ........ 297/423.27 |
| 2015/0191109 A1 * | 7/2015 | Wu et al. ............................ 2/448 |

FOREIGN PATENT DOCUMENTS

| CN | 201922971 U | 8/2011 |
| CN | 202782757 U | 3/2013 |

(Continued)

OTHER PUBLICATIONS

International Search Report for PCT/CN2013/078812 dated Oct. 17, 2013, 5 pages.
(Continued)

*Primary Examiner* — Anthony D Barfield
(74) *Attorney, Agent, or Firm* — Reising Ethington P.C.

(57) ABSTRACT

The invention, relates to Vehicle seat, comprising an upper lid mechanism configured to move between a closed position, where the upper lid mechanism covers the messages system so as to provide foot rest surface, and an open position where the upper lid mechanism transforms and opens up so as to form a foot accommodation space for foot massage. The upper lid mechanism comprises an array of flat sections, and an actuator.

12 Claims, 4 Drawing Sheets

(51) Int. Cl.
*A61H 15/00* (2006.01)
*A61H 23/04* (2006.01)
*A61H 23/02* (2006.01)

(52) U.S. Cl.
CPC . *A61H2201/5071* (2013.01); *A61H 2201/5082* (2013.01); *A61H 2205/12* (2013.01)

(56) References Cited

FOREIGN PATENT DOCUMENTS

| | | | |
|---|---|---|---|
| DE | 10102007041504 A1 | | 3/2009 |
| DE | 102012223380 A1 | * | 6/2014 |
| GB | 2469475 A | * | 10/2010 |
| JP | 2008074122 A | | 4/2008 |
| WO | WO2011135651 A1 | | 11/2011 |

OTHER PUBLICATIONS

Written Opinion for PCT/CN2013/078812 dated Sep. 29, 2013, 5 pages.
International Preliminary Report on Patentability for PCT/CN2013/078812 dated Jan. 20, 2015, 6 pages.

* cited by examiner

VEHICLE SEAT

FIELD OF THE INVENTION

The invention relates to a vehicle seat, particularly to an upper lid mechanism of the foot massage system for the vehicle seat.

BACKGROUND OF THE INVENTION

Nowadays, vehicles hare become one of the main tools for travel. But during a long-time travel, it makes the passengers feel muscle tension or soreness, especially on the feet of the passengers. However, the current soft vehicle seat cannot solve this problem. Although there exists portable massagers which can be put inside of a vehicle or a vehicle seat provided with massage function, their mechanism occupies the interior space of the vehicle which is already very small.

For example, DE 102007041504 describes a footrest behind a backrest and provided with a massage system. However, this document does not describe a mechanism which can provide a function of protection to the massage units while provide a space for the foot massage.

SUMMARY OF THE INVENTION

A technical problem to be solved by the present invention is to overcome the shortcomings of the prior art described above. To this end, the present invention in at least some embodiments provides a vehicle seat comprising a foot massage system, which makes maximum use of the narrow space between the front and rear vehicle seats, wherein the foot massage system is provided with an upper lid mechanism, so as to enable a sufficient space for receiving foot while providing protection to the massage system and providing a foot rest surface. Accordingly, it has the advantage of simple structure, good reliability, and it is easy to assembly, manufacture and use.

Furthermore, at least some embodiments of the present invention include the following unique technical features.

Vehicle seat comprising a seat backrest provided with a foot massage system, and the seat backrest includes a front side and a rear side, the rear side receiving the foot massage system, said foot massage system configured to pivot around an axis that is fixed relative to the seat backrest between an in-use position, wherein the massage system pivots down to receive passenger's feet, and a folded-away position wherein the massage system is retracted, characterized in that the massage system is provided with an upper lid mechanism configured to move between a closed position, where the upper lid mechanism covers the massage system so as to provide a foot rest surface, and an open position where the upper lid mechanism transforms and opens up so as to form a foot accommodation space for foot massage.

In addition, at least some embodiments of the present invention further include a combination of one or more of the following features.

Alternatively, the upper lid mechanism can further comprise an array of flat sections which are configured to pivot to each, and a set of torsion springs is amounted along the pivotal axis direction between every two flat sections so as to make the latter pivot towards each other; and an actuator connected to the array of flat sections so as to drive the latter to move between the closed position and the open position.

Alternatively, the upper lid mechanism can further include a foldable flat section, which is configured in the form of accordion when folded; and an actuator connected to the foldable flat section so as to drive the latter to move along the between the closed position and the open position.

Furthermore, the actuator is a motor and spring system so as to increase the degree of automation of the massage system.

Preferentially, the actuator can further include a damper cooperating with the spring, so as to make the array of flat sections move at uniform velocity for reducing the impulsion to the massage system and keeping the massage system with high stability.

Preferentially, the motor and spring system comprises torsion springs.

Preferentially, the actuator is a motor-driven actuator so as to increase the degree of automation of the massage system.

In addition, the upper lid mechanism can further comprise a foot sensor which is configured to detect the foot when in the open position so as to make the upper lid mechanism automatically move to the closed position when the foot is no longer in the foot accommodation space, so as to improve the personalised experience for passengers.

Compared with the prior art, advantages of the present invention include the use of a sectional construction and torsion springs, which allows a well-controlled transformation (for avoiding interference with seat backrest) when the upper lid mechanism is opening up. When it is closed, the construction also enables to provide a firm support, i.e. foot rest surface.

BRIEF DESCRIPTION OF THE DRAWING

This invention is now described using an example for illustration only that in no way limits the scope of the invention, on the basis of the following drawings, in which.

DESCRIPTION

By referring to the figures, the present invention is further described by the description of embodiments. In the figures, the same references are used to denote identical or similar items.

Figure 1:
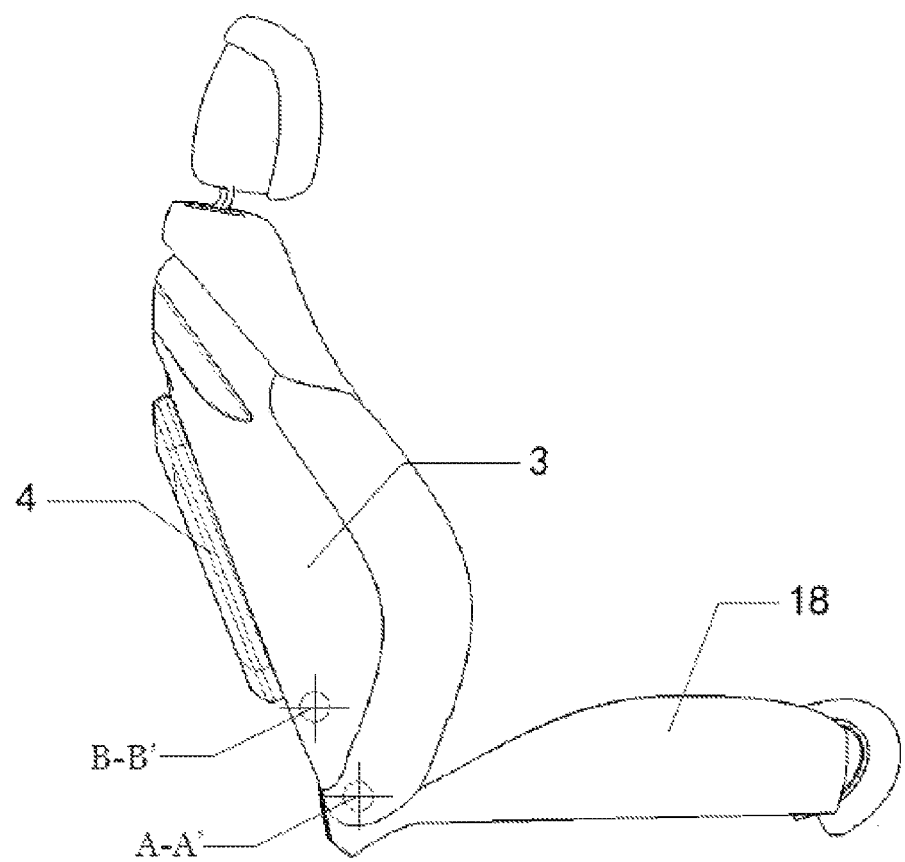
FIG. 1 is the lateral view of the vehicle seat according to the invention.

FIG. 1 shows a vehicle seat which comprises a seat cushion 18 fixed on the frame of the vehicle and a seat backrest comprising a foot massage system 4. The seat backrest rotates around an axis A-A' relative to the seat cushion 18.

Figure 2:
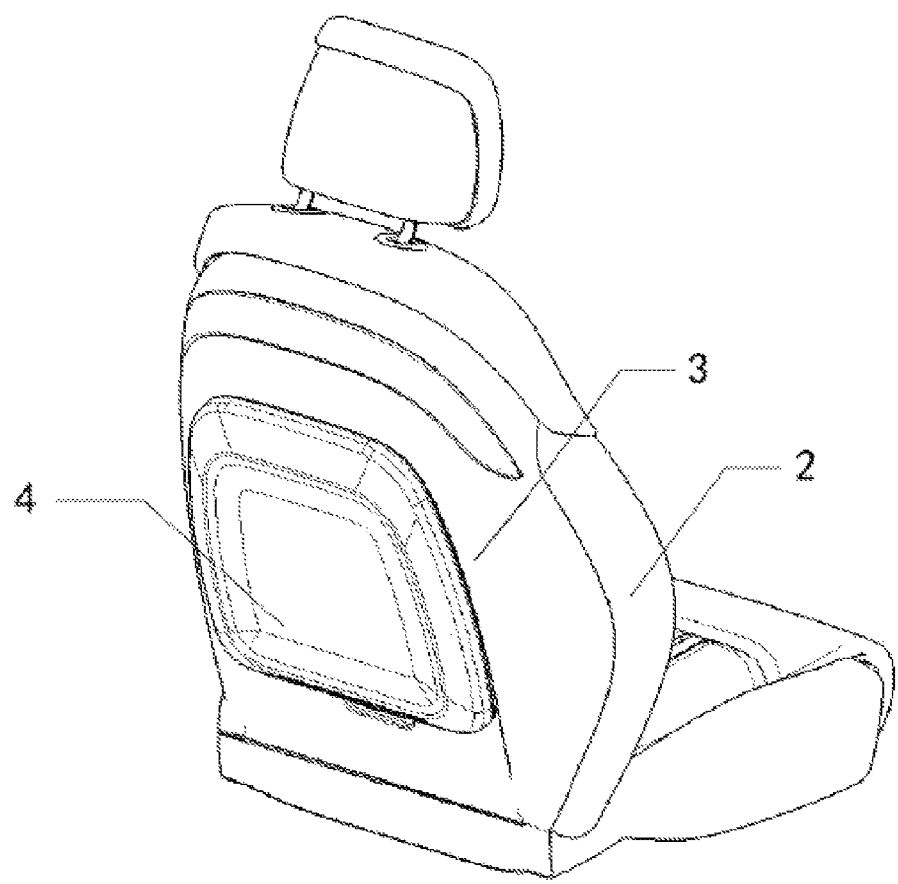
FIG. 2 is a perspective view of the vehicle seat according to the invention, wherein the foot massage system of the first embodiment is in the folded-away position.
Figure 3:
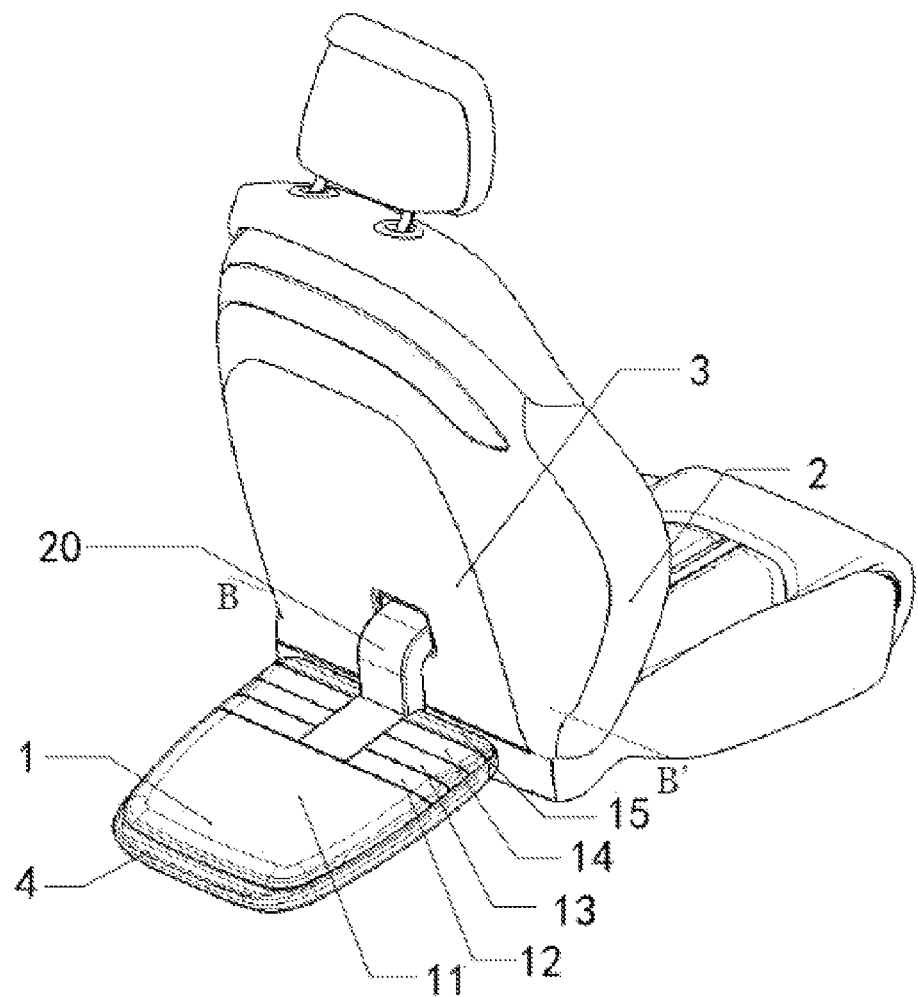
FIG. 3 is a perspective view of the vehicle seat according to the invention, wherein the foot massage system of the first embodiment is in the in-use position, and the upper lip mechanism of the foot massage system is in the closed position.
Figure 4:
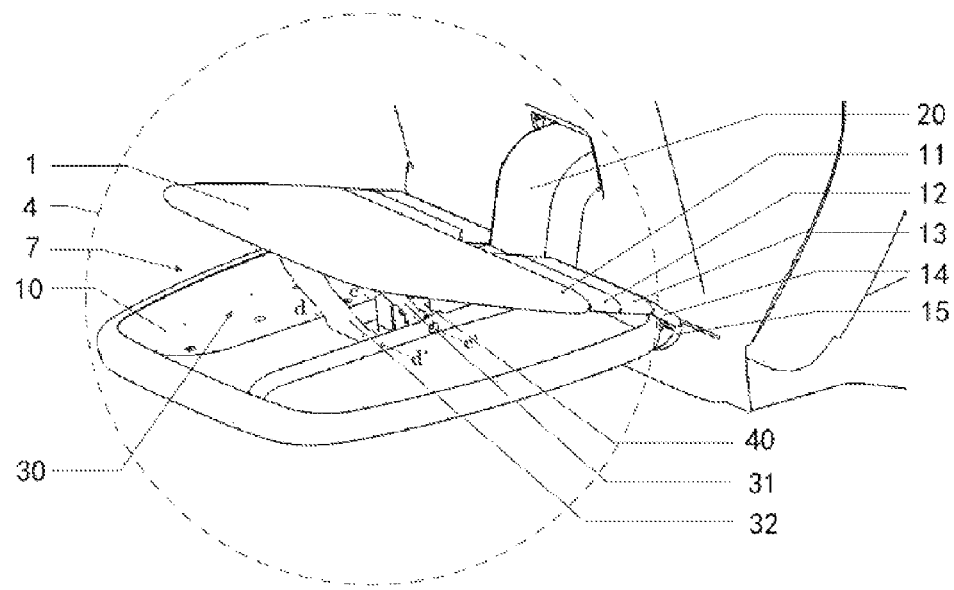
FIG. 4 is a perspective view of the vehicle seat according to the invention, wherein the foot massage system of the first embodiment is in the in-use position, and the upper lip mechanism of the foot massage system is in the open position.

As shown in FIGS. 2-4, in the first embodiment of the invention, the seat backrest of the seat of the vehicle comprises a front side 2 and a rear side 3, wherein the rear side 3 is configured for receiving a foot massage system 4. One end of a fixed folding bracket 20 is fixed to the rear side 3; the other end of the fixed folding bracket 20 is hinged to the foot massage system 4. The foot massage system 4 is driven by a hydraulic device or a pneumatic device or a similar device, so as to pivot around axis B-B' between an in-use position and a folded-away position. When pivoting to the in-use position, the foot message system 4 rotates down from rear side 3 to receive passenger's feet. When pivoting to the folded-away position, the foot massage system 4 turns back to rear side 3.

The foot massage system 4 further comprises an upper lip 1, at least one extendible foot receiving space 7, a massage assembly 30 comprising massage parts, for example electromagnetic massage elements, massage rollers or pneumatic massage elements, and a sensor assembly comprising at least one sensor for example a pressure sensor or a thermal sensor.

The upper lip mechanism 1 comprises an array of flat sections, and an actuator 40 connected to the array of flat sections by a support arm 31 and a support arm 32, wherein the array of flat sections are provided with heatproof surfaces being made of, for example material like dustproof Nano-coating or dustproof coating with high surface density or, dustproof and scratch-proof coating with high surface hardness. The extendible foot receiving space 7 comprises thin plastic or expandable fixed units for holding passenger's feet.

When the passenger presses the starting button on the rear seat (not shown) the front seat moves a certain distance towards a direction away from the passenger sitting on the rear seat via seat rails controlled by control units, so as to leave more space for the passenger sitting on the rear seat. Then, the foot massage system 4 assembled in rear side 3 of the front seat slowly pivots around axis B-B' from toe folded-away position to the in-use position via a device, such as a hydraulic device or a pneumatic device or an electric driving device or similar devices. The passenger thus can put his feet wearing with shoes onto the upper lid mechanism 1 provided with dustproof surface in its closed position, so that he can adjust his sitting posture or relax leg muscles.

When the upper lid mechanism 1 is in the closed position, a large flat section 11 and an array of flat sections 12, 13, 14, 15 (the array of flat sections of the invention are not limited to 4 pieces, the number of pieces can be freely determined according to the vehicle type and customer's needs) are arranged as a plane which substantially covers the whole foot massage portion 30. The adjacent two flat sections of large flat section 11 and the array of flat sections 12, 13, 14, 15 are rotatablely connected to each other one by one through hinge devices or similar connecting devices. Accordingly, there is a set of torsion springs amounted along the pivotal axis direction between every two flat sections, so as to allow the two flat sections pivot towards each other to close up without any external torsion on the direction of rotation. Further, a small gap is between every two adjacent flat sections, so that their pivot won't lead to interference. Each edge of the flat sections has a thickness and presents a circular arc, wherein the circular arcs of the adjacent flat sections cooperate with each other which provides an arc transition. It is useful to further avoid the interference which may occur when the two adjacent flat sections pivot. Also due to the circular arc, it is easier to clean the dust dropping in the small gap.

When the passenger uses foot massage, he can take back his feet and then press the massage button, so as to trigger the upper lid mechanism 1 to automatically open up via electric circuits. During the process of the movement of the upper lid mechanism expanding from its closed position to its open position, the actuator 40 fixed in the massage system 4 pushes the support arm 31 (alternatively the support arm 32) to pivot around axis c-c', so as to elevate the large flat section 11 connecting with it, and therefore to drive the support arm 32 (alternatively the support arm 31) to pivot around axis d-d' along a guide path from an original position to a fixed supporting position, so that the support arms 31 and 32 form a stable support for the upper lid mechanism 1 and thus form a foot receiving space 7. Preferably, the support arms 31 and 32 and the actuator 40 are arranged in a line. Actuator 40 can be a motor or a spring system and may comprise a bumper cooperating to the spring, so as to allow smooth movement and low noise.

When the upper lid mechanism 1 is expanded, the movement of large flat section 11 drives the array of flat sections connected with it to move towards the seat backrest. After she array of flat sections 12, 13, 14, and 15 cross over the fixed folding bracket 20, they tilt down by the sets of torsion springs amounted on each hinge axis, and are curled through the space between the foot massage system 4 and the rear side 3 of the seat backrest, and thus keep a distance with the seat backrest. Therefore, the array of flat sections will not interfere with the rear side of the seat, which thus prevents the rear side of the seat from being damaged due to friction, and prevents the possibility of flat sections being stuck. Alternatively, the array of flat sections can tilt according to at least one guide track for guiding them along a fixed track. The fixed track can also ensure that no interference between the arrays of flat sections and the seat backrest will happen during the progress.

After the upper lid mechanism 1 is completely expanded, at least one extendible foot receiving space 7 is formed, as shown in FIG. 4. The foot receiving space 7 has an open space with several openings. Thus, it is easy for the passenger to put his feet into the extendible foot receiving space 7 and take his feet out of the receiving space 7 especially in emergency.

When the upper lid mechanism 1 is completely in the open position, the actuator 40 stops working and correspondingly the support arms 31 and 32 visa stop pivoting. The whole upper lid mechanism 1 is in a static and stable state. Then, the passenger can put his feet into the foot receiving space 7 for massage.

After the passenger finishes the foot message, he can press the massage button to stop the massage function, then take his feet away from the foot receiving space 7 and leave away from the foot massage system 4 in the working position. Then the actuator 40 starts an inverse operation, drive the support arm 31 (alternatively the support arm 32) inversely pivot back to the original position, so as to drive the whole upper lid mechanism 1 back to the closed position and further drive the support arm 32 (alternatively the support arm 31) back to the original position. In this case, the upper lid mechanism 1 returns to the original flat position (as shown in FIG. 3) i.e. the closed position indirectly by the actuator 40. In the end, the foot massage system 4 pivots back to rear side 3.

In addition, if a passenger forgets to press the button to drive the foot massage system 4 back to the rear side 3 of the seat backrest after finishing massage, as long as the sensor no longer senses any foot on the foot receiving space 7 for a period of time, the actuator 40 will automatically start the inverse operation to drive the support arm 31 (alternatively the support arm 32) inversely pivot back to the original position. Accordingly, the whole upper rid mechanism 1 is driven back to the closed position and further the support arm 32 (alternatively support arm 31) is driven back to the original position. Then, the foot massage system 4 pivots around axis B-B' and turns hack to the rear side 3. In the end, the front seat translates back to the original position, via the seat rails controlled by control units.

Alternatively, in the second embodiment of the invention, the upper lid mechanism 1 has a foldable flat section. Compared with the first embodiment, the difference is that the foldable flat section is one piece in the closed position rather than the array of flat sections connected by hinges and torsion springs. During the process of the upper lid mechanism 1 expanding from the closed position to the open position, the foldable flat section presents the form of accordion which can fold towards the seat backrest with the large flat section 11 by the actuator 40.

Alternatively, in the third embodiment of the invention, the upper lid mechanism 1 has overlapping flat sections of which the construct is similar to a matryoshka shape (a series of section with similar shape but with diminishing size). During the process of the upper lid mechanism 1 expanding from the closed position to the open position, the overlapping flat sections successively overlaps into the largest one with large flat section 11 by the actuator 40.

It should be noted that, the embodiments mentioned above are used as examples and cannot be construed as limiting the scope of the invention. On the basic of this, a man skilled in the art could expect other embodiments having the same function within the scope of protection of the application.

The invention claimed is:

1. A vehicle seat comprising a seat backrest provided with a foot massage system, and the seat backrest includes a front side and a rear side, the rear side receiving the foot massage system, said foot massage system configured to pivot around an axis that is fixed relative to the seat backrest between an in-use position where the massage system pivots down to receive a passenger's feet, and a folded-away position where the massage system is retracted,
   wherein the massage system is provided with an upper lid mechanism configured to move between a closed position where the upper lid mechanism covers the massage system so as to provide foot rest surface, and an open position where the upper lid mechanism transforms and opens up so as to form a foot accommodation space for foot massage.

2. The vehicle seat according to claim 1, wherein the upper lid mechanism comprises:
   an array of flat sections which are configured to pivot relative to each other, and a set of torsion springs mounted along the pivotal axis direction between every two adjacent flat sections so as to make the two adjacent flat sections pivot towards each other; and
   an actuator connected to the array of flat sections so as to drive the array of flat sections to move the upper lid mechanism between the closed position and the open position.

3. The vehicle seat according to claim 2, wherein the actuator is a motor and spring system.

4. The vehicle seat according to claim 3, wherein the actuator further comprises a damper cooperating with the spring, so as to make the array of flat sections move at uniform velocity.

5. The vehicle seat according to claim 3, wherein the motor and spring system comprises torsion springs.

6. The vehicle seat according to claim 2, wherein the actuator is a motor-driven actuator.

7. The vehicle seat according to claim 1, wherein the upper lid mechanism comprises:
   a foldable flat section which is configured in the form of accordion when folded;
   an actuator connected to the foldable flat section so as to drive the foldable flat section to move between the closed position and the open position.

8. The vehicle seat according to claim 7, wherein the actuator is a motor and spring system.

9. The vehicle seat according to claim 8, wherein the actuator further comprises a damper cooperating with the spring, so as to make the foldable flat section move at uniform velocity.

10. The vehicle seat according to claim 8, wherein the motor and spring system comprises torsion springs.

11. The vehicle seat according to claim 7, wherein the actuator is a motor-driven actuator.

12. The vehicle seat according to claim 1, wherein the upper lid mechanism further comprises a foot sensor which is configured to detect the foot when in the open position so as to make the upper lid mechanism automatically move to the closed position when the foot is no longer in the foot accommodation space.

\* \* \* \* \*